United States Patent [19]
Nishioka et al.

[11] Patent Number: 6,066,940
[45] Date of Patent: May 23, 2000

[54] CAPACITOR CHARGING METHOD

[75] Inventors: Yoshinao Nishioka, Shiga-ken; Toshinari Tabata, Otsu, both of Japan

[73] Assignee: Murata Manufacturing Co., Ltd., Japan

[21] Appl. No.: 09/187,598

[22] Filed: Nov. 6, 1998

Related U.S. Application Data

[63] Continuation-in-part of application No. 09/003,263, Jan. 13, 1998.

[30]  Foreign Application Priority Data

Jan. 6, 1997 [JP] Japan .................................... 9-012021
Dec. 25, 1997 [JP] Japan .................................... 9-367816

[51] Int. Cl.[7] .............................................. H01M 10/46
[52] U.S. Cl. ...................................... 320/139; 320/166
[58] Field of Search ................................... 320/125, 129, 320/139, 141, 145, 166, 167

[56]  References Cited

U.S. PATENT DOCUMENTS

| | | | |
|---|---|---|---|
| 5,245,524 | 9/1993 | Nakagawa et al. | 320/166 X |
| 5,296,797 | 3/1994 | Bartlett . | |
| 5,329,218 | 7/1994 | Rydborn | 320/139 |
| 5,498,951 | 3/1996 | Okamura et al. | 320/166 X |

*Primary Examiner*—Edward H. Tso
*Attorney, Agent, or Firm*—Ostrolenk, Faber, Gerb & Soffen, LLP

[57]  ABSTRACT

When DC voltages are intermittently applied to a capacitor and when an initially applied voltage $E_1$ is higher than a subsequently applied voltage $E_2$, charging rapidly advances even during a period in which no voltage is applied. Higher-speed charging is performed than in a case in which the same voltage is continuously applied.

11 Claims, 7 Drawing Sheets

CAPACITOR CHARGING METHOD

CROSS-REFERENCE TO RELATED APPLICATION

This is a continuation-in-part of Ser. No. 09/003,263 filed Jan. 6, 1998, pending.

BACKGROUND OF THE INVENTION

1. Field of the Invention

The present invention relates to capacitor charging methods which are adaptable for measuring the insulation resistance of a capacitor and for determining whether a capacitor is acceptable.

2. Description of the Related Art

To determine whether a capacitor is acceptable, according to a known method for measuring the insulation resistance of the capacitor, a DC voltage is applied to the capacitor and the leakage current (charging current) of the capacitor is measured after the capacitor is sufficiently charged. As a matter of course, the leakage current is low in an acceptable capacitor. Then the insulation resistance can be determined from the voltage and current by Ohm's law.

An insulation-resistance measuring method of this type is specified in Japanese Industrial Standard (JIS) No. C5102. This measuring method requires a measurement time of about 60 seconds because a current needs to be measured after a capacitor has been sufficiently charged. In order for the cost of electronic units to be reduced and in order to increase their reliability, however, improvement is needed in the manufacturing capacity and the quality of electronic components such as capacitors. This requirement cannot be satisfied by the conventional measuring method, which requires such a long measurement time period for each capacitor.

In addition to the above method, which continuously applies a DC voltage, there has been known a capacitor charging method in which a DC voltage is intermittently applied (Japanese Unexamined Patent Publication No. 4-254769). This charging method is suited to a case in which a characteristic is measured with the use of a turn table which is intermittently rotated. This method can be used for continuous characteristic measurement for a number of capacitors supplied from a parts feeder. One type of insulation-resistance measuring method employing a turn table is the continuous type in which the insulation resistance of each capacitor is measured one by one when the capacitors have been charged at a plurality of charging areas. Another type of method is the batch type in which a specified number of capacitors are supplied to a turn table, the turn table is stopped, and charging and insulation-resistance measurement are performed at the same time on a plurality of capacitors. Both types of method require a long time period for charging and do not have good charging efficiency.

The inventors of this application have found after intensive research on intermittent application of a DC voltage to a capacitor that even intermittent voltage application has the same effect as continuous voltage application, under certain conditions. In other words, the same charging characteristic is obtained by intermittent voltage application as by continuous voltage application. Even if voltage application is stopped for a moment, if it is for a short period, charging still advances.

FIG. 1 and FIG. 2 show the relationship between the current and the time in cases in which a DC voltage was continuously applied to a ceramic capacitor and a DC voltage was intermittently applied to the ceramic capacitor, respectively, with coordinates being plotted along a logarithmic current scale and a logarithmic time scale and with measurement of current changes. In the continuous voltage application, as shown in FIG. 1, an almost constant, high current flowed during a short period 1, following the starting time $t_0$. Then the current rapidly decreased during a transition period 2. And then, the current decreased with a linear charging characteristic 3 having a certain gradient. This linear charging characteristic 3 continued until one to two minutes elapsed after the charging started.

In the intermittent voltage application, as shown in FIG. 2, characteristics 1, 2, and 3 during a first voltage application were the same as those in the continuous voltage application. The voltage application was stopped at a time $t_a$ and the capacitor was discharged to ground. And then a second voltage application was performed at a time $t_b$. The current rapidly increased with a characteristic 4 and rapidly decreased to be stable with a linear charging characteristic 5. Although the top section of the characteristic 4 cannot be clearly seen because the horizontal axis is a logarithmic time scale in FIG. 2, the section was actually formed of a level part which was the same as the characteristic 1 and a transition period which was the same as the characteristic 2. It was found that the linear charging characteristic 5 was positioned along a line which extends from the linear charging characteristic 3, which was obtained in the first voltage application. When the intermittent voltage application was repeated at a time td, the same characteristics as those shown at 4 and 5 were repeated and the current curve became stable along a line which extends from the linear charging characteristics 3 and 5. The same voltage was applied in the above continuous and intermittent voltage applications.

In each case, a current $i_3$ was measured at a time $t_3$ after a constant time T had elapsed from the start of both the continuous voltage application and the intermittent voltage application. The same current $i_3$ was measured in both cases. In other words, even when a DC voltage is intermittently applied, if an OFF period ($t_a$ to $t_b$) in the intermittent application is short (equal to or less than several hundred milliseconds, for example), the same result is obtained as when charging is performed with continuous voltage application.

According to an experiment performed by the inventors of this application, the same result was obtained as when continuous application was performed, for a capacitor having a capacitance of 0.01 $\mu$F or less if the OFF time period of intermittent application was 500 ms or less.

By examining the above charging characteristics, the following fact was found. An equivalent circuit of the capacitor is formed of a capacitor $C_0$, an internal resistor r, an insulation resistor $R_0$, and a dielectric polarization component D, as shown in FIG. 3. It was found that the non-linear characteristics 1 and 4 shown in FIGS. 1 and 2 correspond to the charging stage of the capacitor $C_0$ whereas the linear charging characteristics 3 and 5 correspond to the charging stage of the dielectric polarization component D.

Summarizing, it was found that the above intermittent voltage application causes the same result as continuous voltage application. In other words, the charging speed of the capacitor is the same.

SUMMARY OF THE INVENTION

The inventors of this application have found with further research on intermittent application of a DC voltage to a capacitor that higher-speed charging can be performed by intermittent voltage application under certain conditions than by continuous application of a constant voltage. According to this fact, charging can be performed at a higher speed than by continuous application of a constant voltage, and the measurement of capacitor insulation resistance or the determination of whether a capacitor is acceptable can be performed in a short period.

Accordingly, it is an aspect of the present invention to provide a capacitor charging method in which high-speed charging is obtained by intermittently applying a DC voltage to a capacitor.

The foregoing is achieved according to the present invention by a capacitor charging method in which a DC voltage is intermittently applied to a capacitor, wherein an initially applied voltage $E_1$ is set higher than a subsequently applied voltage $E_2$.

The inventors of the present invention obtained the result shown in FIG. 4 with an intermittent voltage application method in which the applied voltage is changed. In the continuous voltage application method shown in FIG. 1 and the intermittent voltage application shown in FIG. 2, a rated constant voltage $E_0$ was applied. In FIG. 4, a first applied voltage $E_1$ was set higher than the rated voltage and a second applied voltage $E_2$ was set to the rated voltage.

In FIG. 4, characteristics 1 to 3 in the first voltage application are substantially the same as those shown in FIGS. 1 and 2. In the second voltage application, the current rises with a characteristic 6 and then drastically decreases to become stable with a linear charging characteristic 7. The current on the linear characteristic 7 is lower than that on the linear characteristic 5 shown in FIG. 2. In other words, the characteristic 7 is not on a line extended from the characteristic 3. When a third voltage application (at a voltage of $E_2$) is performed, the current becomes stable on a line extended from the linear characteristic 7.

The charging characteristics 6 and 7 shown in FIG. 4 are obtained when the capacitor is discharged to the ground in a time period ($t_a$ to $t_b$) between the first voltage application and the second voltage application. A charge accumulated in the capacitor $C_0$ (see FIG. 3) becomes almost zero, and with the voltage $E_2$ being applied, the capacitor is charged with the characteristics 6 and 7, which are similar to the characteristics 1, 2, and 3.

On the other hand, when the capacitor is set open in the period ($t_a$ to $t_b$) between the first voltage application and the second voltage application, charging characteristics 6' and 7' shown in FIG. 5 appear. This is because the charge accumulated in the capacitor $C_0$ flows in reverse when the voltage $E_2$ is applied since $E_1$ is higher than $E_2$. Therefore, the current begins at a negative value and then passes through the vicinity of zero to a charging value to form the characteristics 6' and 7'.

It is clear from FIGS. 4 and 5 that the charging characteristic 7 is obtained earlier when the capacitor is discharged between voltage applications as shown in FIG. 4. On the other hand, a step of connecting the capacitor to ground can be omitted when the capacitor is set open (open-circuited) in the method shown in FIG. 5.

As described above, the charging characteristics 1 to 3 obtained by applying first voltage $E_1$ are substantially the same as those obtained by applying the rated voltage, but the charging current obtained in the second voltage application (voltage $E_2$) is greatly reduced as compared with that obtained by the rated voltage application. Thus, this type of voltage application implements faster charging than continuous voltage application. Therefore, the intermittent voltage application with the foregoing voltages reduces the charging time to a time $t_4$ whereas continuous voltage application or intermittent voltage application with the rated voltage needs the time $t_3$ until the certain current $i_3$ is reached.

By examining the ratio of the initially applied voltage $E_1$ and the subsequently applied voltage $E_2$, it was found that a conspicuous improvement is obtained when $E_1/E_2 \geq 1.2$. Especially when $E_1/E_2$ was set to 2 or more, charging proceeded at a speed several times higher than when $E_1$ was equal to $E_2$ or no more than 1.2 times $E_2$, thereby reducing the charging time greatly.

In a third voltage application (with the voltage $E_2$), after the capacitor is discharged to the ground in a time period from $t_c$ to $t_d$, a characteristic shown in FIG. 4 is obtained in which there is a high current which then drastically decreases. On the other hand, when the capacitor is set open in the time period $t_c$ to $t_d$, a lower initial current value is obtained than when the capacitor is discharged, and then the current decreases along the same curve to become stable along a line extended from the characteristic 7', as shown in FIG. 5. This can be considered to be because the charge accumulated in the capacitor $C_0$ is released when the capacitor is discharged whereas the charge accumulated in the capacitor $C_0$ moves into the capacitors $C_1$ to $C_n$ when the capacitor $C_0$ is set open. Therefore, the current changes earlier to the charging characteristic 7' when the capacitor is set open than when the capacitor is discharged.

In the present invention, instead of discharging the capacitor to ground during the time periods, $t_a$ to $t_b$ and $t_c$ to $t_d$, a voltage lower than $E_2$ may be applied instead. Alternatively, a negative voltage can be applied so that the current flows in reverse. In either case, the same effect is obtained as when the capacitor is discharged to ground.

The period during which the capacitor is discharged to ground, or a lower voltage than $E_2$ is applied, or a negative voltage is applied, is not necessarily equal to the entire period, $t_a$ to $t_b$ or $t_c$ to $t_d$, but rather may be only a part of the whole period. In other words:

0 < period of discharging $\leq t_a$ to $t_b$, or $t_c$ to $t_d$

According to the present invention, since it is unnecessary to stop a measuring apparatus (such as a turn table) for a long period, which is required in the continuous voltage application method, and insulation resistance can be measured while a capacitor is being intermittently carried, manufacturing capacity is increased.

Especially when a measuring apparatus having a turn table is used, the size of the charging area can be reduced and the number of measurement terminals can also be reduced.

When the initially applied voltage $E_1$ is set to a high value, if the application period $T_1$ of the voltage $E_1$ is reduced, the same effect is obtained. In other words, when the application period $T_1$ of the voltage $E_1$ is reduced to be shorter than the period $T_2$ of the subsequently applied voltage $E_2$, the same effect is obtained, further reducing the charging time period. This effect is effective to increase the processing capacity in the batch method, in which a specified number of capacitors are supplied to a turn table, the turn table is stopped, and charging and insulation-resistance measurement are performed at the same time for a plurality of capacitors.

In this case, the initial time period $T_1$ needs to be at least the sum of the charging period 1 and the transition period 2 of the capacitor $C_0$. It is preferred that this time period $T_1$ be set to 100 milliseconds or less so that a capacitor can be measured in a short period of time.

It is clear from the above descriptions that according to the present invention, when DC voltages are intermittently applied to a capacitor and the initially applied voltage $E_1$ is higher than the subsequently applied voltage $E_2$, charging rapidly advances even during a period in which a voltage is not applied, and charging is performed at a higher speed than in a case when the same voltage is continuously applied. As a result, insulation-resistance measurement and the determination of whether a capacitor is acceptable can be performed at a high speed, and measuring capacity is greatly improved.

DESCRIPTION OF PREFERRED EMBODIMENTS

Figure 6:
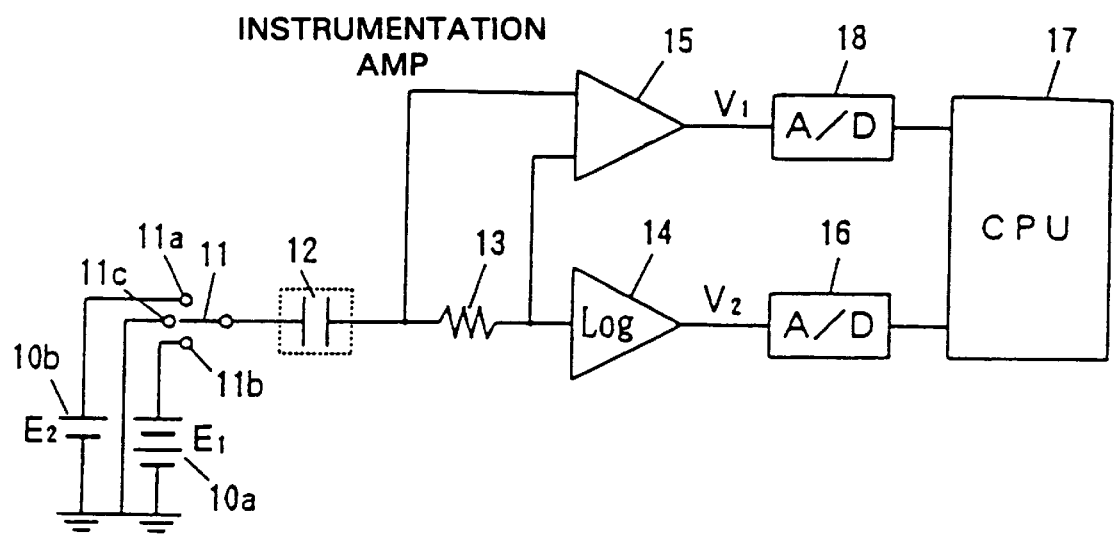
FIG. 6 is a circuit diagram of a current measuring apparatus.

FIG. 6 is a block diagram of a current measuring apparatus with which a method according to the present invention is implemented. The inventors of the present application have proposed this measuring apparatus in Japanese Unexamined Patent Publication No. 7-293442.

This measuring apparatus is provided with DC-current measurement power sources 10a and 10b, a switch 11, a capacitor 12 under measurement, a limiting resistor 13, a logarithmic amplifier 14, an instrumentation amplifier 15, A/D converters 16 and 18, and a calculation processing circuit (CPU) 17. The current is measured with the instrumentation amplifier 15 in an early charging stage. Then the amplifier is switched to the logarithmic amplifier 14 at a certain threshold, and the current is measured with the logarithmic amplifier 14 after that. Since this measuring apparatus measures the charging current of the capacitor 12 even if the current changes in a wide range, it can continuously measure the current from the early charging stage to the late charging stage, which is difficult with the conventional measuring apparatus.

The switch 11 is switched by the CPU 17 at a certain interval. A DC voltage is intermittently applied to the capacitor 12 from either one of the DC-current measuring power sources 10a and 10b. The voltage $E_2$ of the power source 10b is set to the rated voltage (25 volts in this embodiment) and the voltage $E_1$ of the power source 10a is set higher than $E_2$. To discharge the capacitor to ground during a period between the applications of the voltages $E_1$ and $E_2$, it is necessary to provide a contact point 11c connected to ground, between the contact points 11a and 11b. The contact point 11c is unnecessary if the capacitor is to be set open during the period between the applications of the voltages $E_1$ and $E_2$.

The time interval when the switch 11 is turned on and off is not necessarily constant. For example, a second ON time period $T_2$ may be set longer than a first ON time period $T_1$. Alternatively, the first ON time period $T_1$ may be set longer than the second ON time period $T_2$. When a voltage is applied three times or more, each ON time period may be changed.

A measuring apparatus with which a method according to the present invention is implemented is not limited to the measuring apparatus shown in FIG. 6. Any other apparatus can be used as long as different voltages can be intermittently applied to a capacitor.

Figure 1:
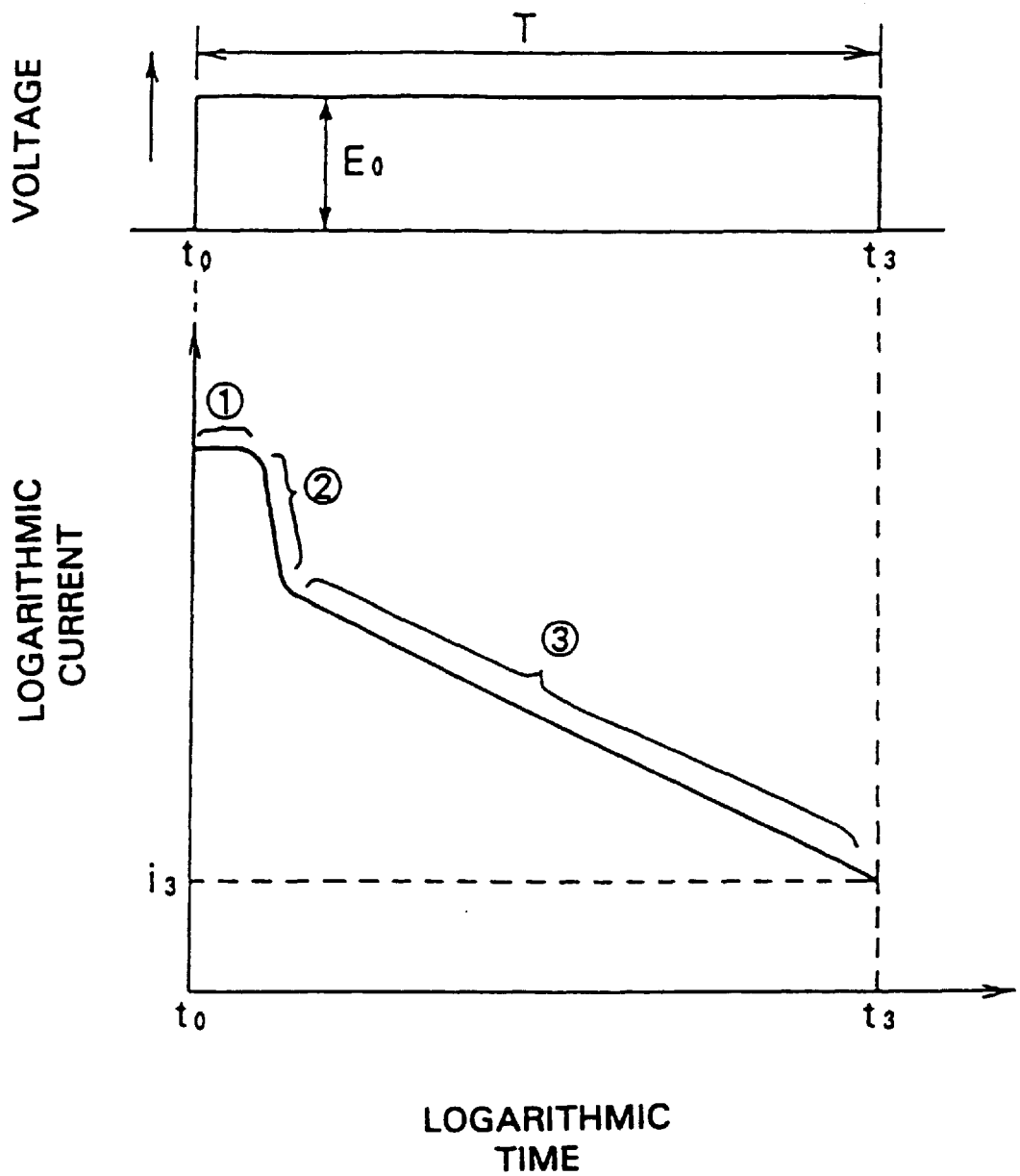
FIG. 1 is a graph showing charging characteristics when a DC voltage is continuously applied to a capacitor.
Figure 2:
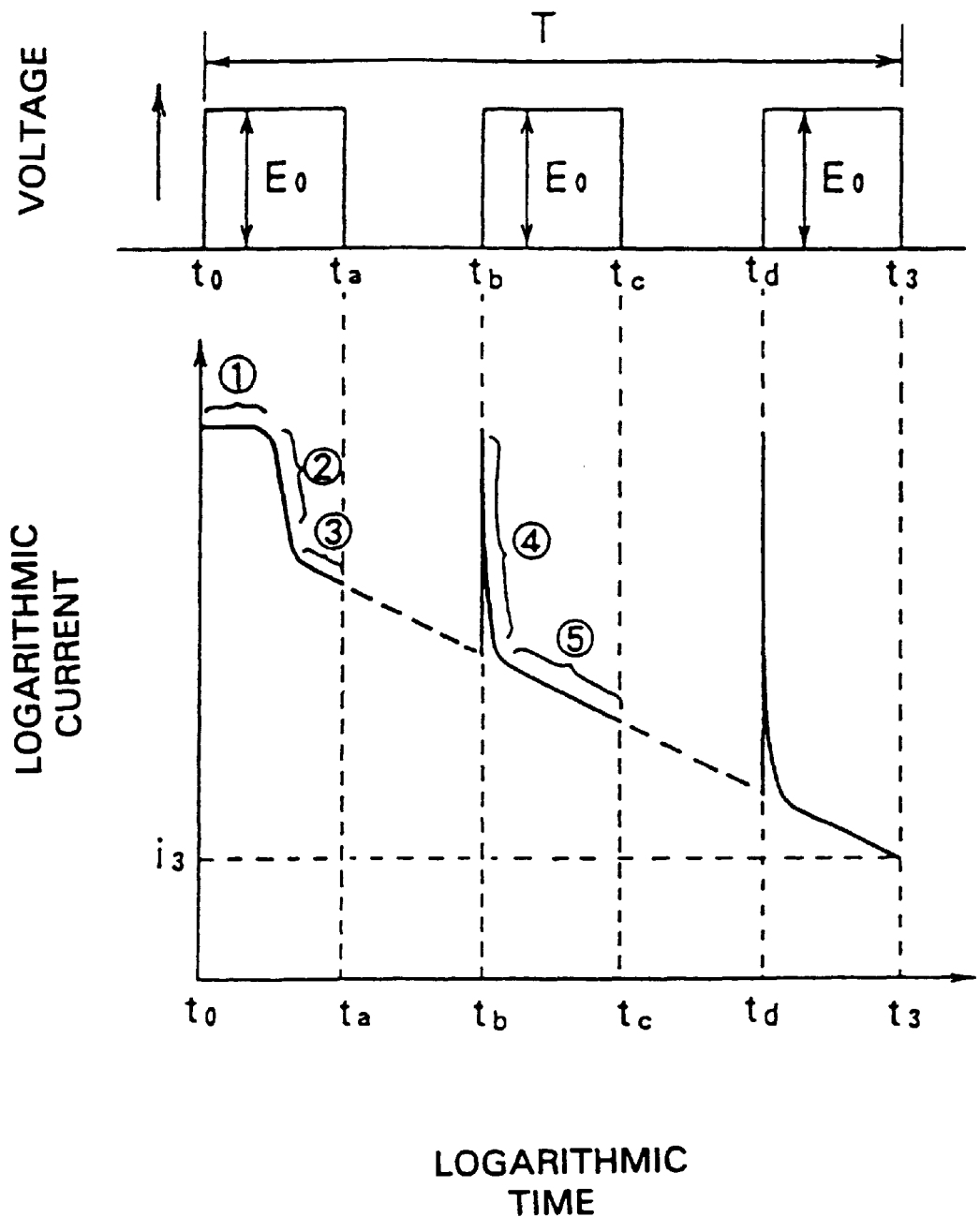
FIG. 2 is a graph showing charging characteristics when a DC voltage is intermittently applied to a capacitor.
Figure 3:
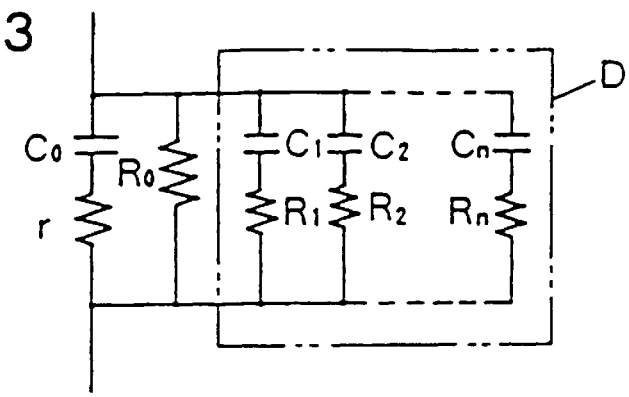
FIG. 3 is an equivalent circuit diagram of a capacitor.
Figure 4:
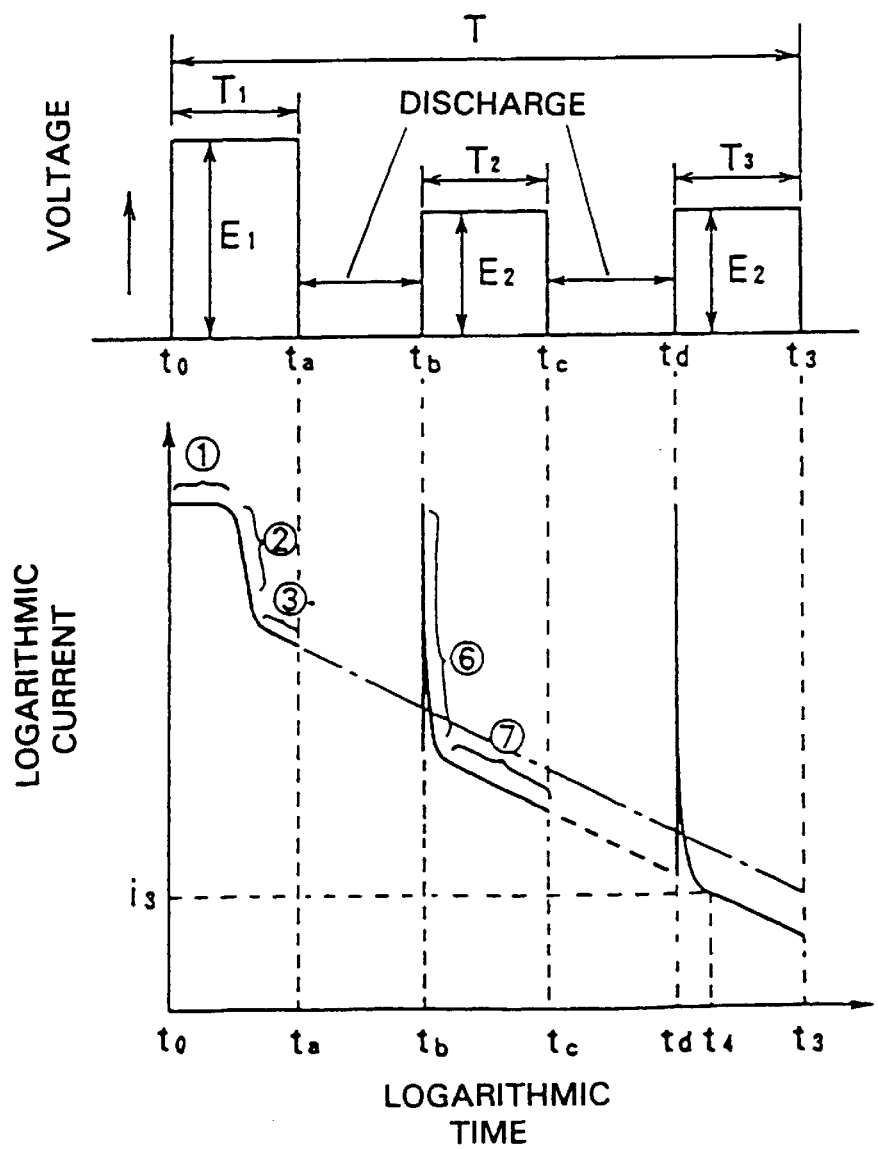
FIG. 4 is a graph showing charging characteristics when DC voltages are intermittently applied (with the capacitor being discharged between voltage applications) to a capacitor according to a method of the present invention.
Figure 5:
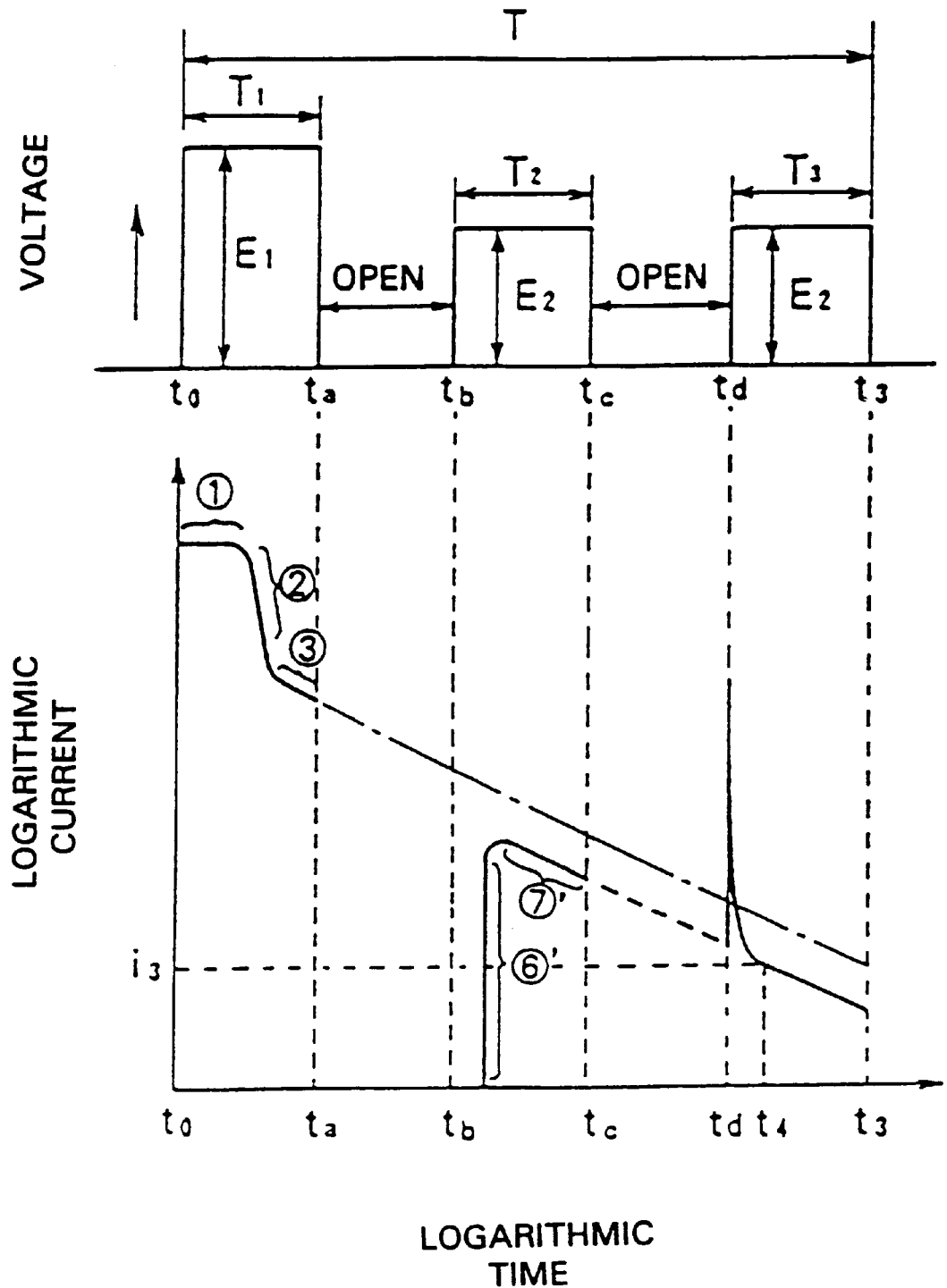
FIG. 5 is a graph showing charging characteristics when DC voltages are intermittently applied (with the capacitor being in an open state between voltage applications) to a capacitor according to a method of the present invention.
Figure 7:
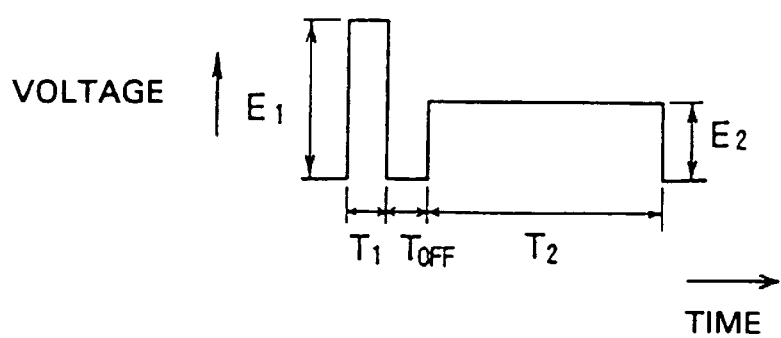
FIG. 7 is a waveform chart showing voltages intermittently applied.
Figure 8:
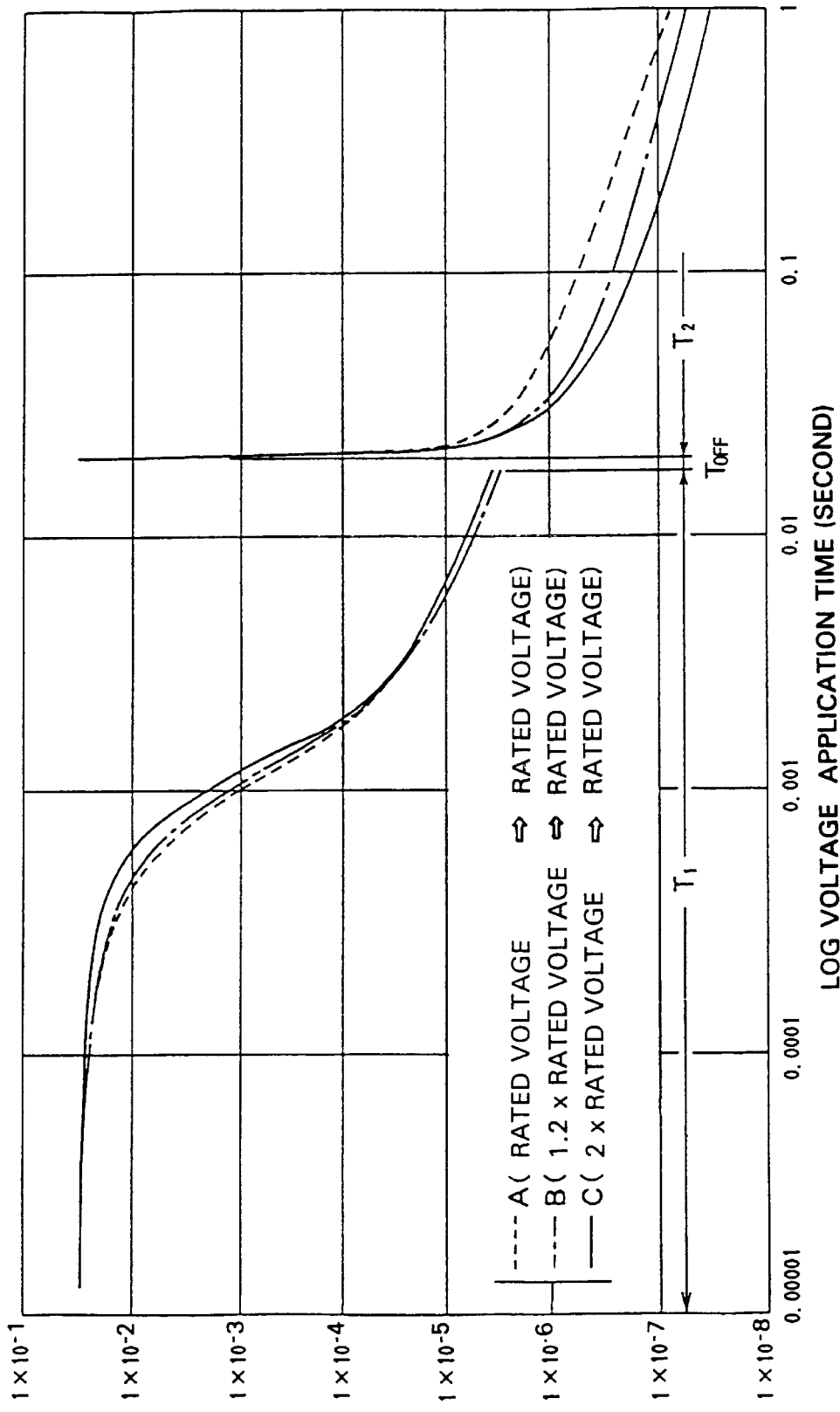
FIG. 8 is a graph of actual charging characteristics in a case in which the voltages shown in FIG. 7 are intermittently applied.

FIG. 8 shows charging characteristics in a case A in which the rated voltage (25 volts) was intermittently applied twice as shown in FIG. 2 and in cases B and C in which different DC voltages $E_1$ and $E_2$ were intermittently applied as shown in FIG. 7. A laminated ceramic capacitor was used with an initial charging current of 50 milliamperes. In the experiments A to C, the (ON) time period $T_1$ of a first voltage application was set to 20 milliseconds, a discharging time period $T_{OFF}$ was set to 20 milliseconds, the (ON) time period $T_2$ of a second voltage application was set to 1 second, and each applied voltage was set as follows:

| Experiment | A | B | C |
|---|---|---|---|
| First applied voltage (E1) | 25 V | 30 V | 50 V |
| Second applied voltage (E2) | 25 V | 25 V | 25 V |

It is clearly understood from FIG. 8 that the cases A, B and C show nearly the same charging characteristic in the first voltage application and the charging current in the second voltage application decreases from case A, to case B. to case C. Charging is performed the fastest in case C. Charging is performed faster in case B than in case A. The time required for the charging current to be reduced to $1 \times 10^{-7}$ amperes or less is about 0.8 seconds in case A, about 0.4 seconds in case B, and about 0.16 seconds in case C. Higher-speed charging is performed in cases B and C than in case A.

The inventors of the present application found from further experiments in which $E_1/E_2$ was set greater than 2 that the charging speed increases as $E_1/E_2$ increases. The inventors also found that even when the voltages applied in the first and second applications are set higher than the rated voltage, if the same voltage is applied in the first and second applications, just the same characteristics as those shown in FIG. 2 are obtained.

The inventors confirmed that the same effect was obtained when the time period $T_1$ of the first voltage application was set shorter than the time period $T_2$ of the second voltage application. Therefore, the charging time can further be reduced. The time period $T_1$ depends on the capacitance of a capacitor to be measured and must ensure the following condition:

Charging time period 1+transition time period 2 of $C_0 \leq T_1$

To respond to the demand for short insulation-resistance measurement of a laminated ceramic capacitor, it is preferred that the time period $T_1$ satisfy the following condition.

$T_1 \leq 100$ ms

The time period $T_2$ is set to any value according to the required processing capability for a capacitor under measurement.

Figure 9:
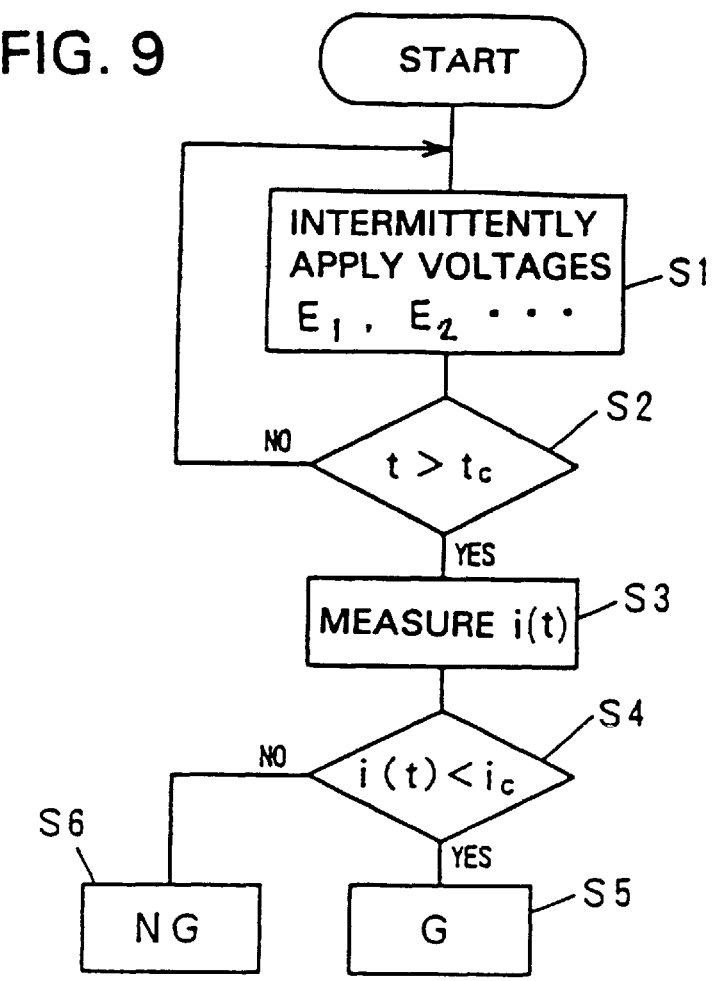
FIG. 9 is a flowchart of a method for determining whether a capacitor is acceptable, which uses a charging method according to the present invention.

FIG. 9 is a flowchart of a method according to the present invention for determining whether a capacitor is acceptable.

Different voltages $E_1, E_2, \ldots$ are intermittently applied in a step S1.

It is determined whether the elapsed time t from the voltage application start has reached the specified time $t_c$ in a step S2. This time $t_c$ is the reference time for the charging current to reach a threshold value $i_c$ by intermittent voltage application, and is set, for example, to 1 to 10 seconds. If the elapsed time t has not yet reached the specified time $t_c$, intermittent voltage application is repeated.

When the specified time $t_c$ has elapsed, the current i(t) is measured in a step S3. This current i(t) is compared with the threshold value $i_c$, used for determining whether the capacitor is acceptable in a step S4.

If i(t) is lower than $i_c$, it is determined in a step S5 that the capacitor is acceptable since charging has advanced sufficiently. If i(t) is not lower than $i_c$, the capacitor is determined in a step S6 to be unacceptable since charging has not yet sufficiently advanced.

When a capacitor has been charged according to a method of the present invention, either the insulation resistance thereof is measured or it is determined whether the capacitor is acceptable by comparing the current obtained after charging for the specified time with the threshold. The processing operations following the charging are not specified.

Figure 10:
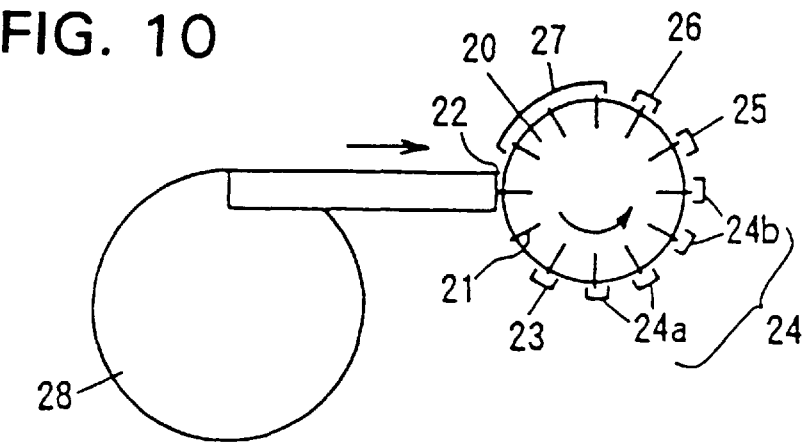
FIG. 10 is a plan of a characteristic measuring and selecting apparatus using a method of the present invention.

FIG. 10 is a characteristic measuring and selecting apparatus employing a method of the present invention.

A turn table 20 rotates intermittently in the direction indicated by an arrow by one step. On the circumference of the turn table 20, a plurality of holding sections 21 each of which can hold one chip-type capacitor to be measured are provided at equal intervals. There are provided around the turn table 20 a supply section 22 for supplying capacitors to the turn table 20, a capacitance measuring section 23, a charging section 24 in which the present invention is applied, an IR measuring section 25 for measuring a charging current, a discharging section 26, and a taking-out section 27. In the supply section 22, a supply unit 28 such as a parts feeder for supplying capacitors to the turn table 20 one by one is disposed.

The charging section 24 is divided into a plurality of stages. For example, the first-half stage 24a applies a voltage $E_1$ and the second-half stage 24b applies a voltage $E_2$. Each of the stages 24a and 24b can be formed of a plurality of portions for performing a plurality of voltage applications. Alternatively, each of the stages may be formed of one portion for performing one voltage application.

Since a capacitor needs to be charged for a long time on a turn table in the conventional method, a charging area must be large and thereby the turn table itself becomes large. Conversely, with the method of the present invention, since a capacitor can be charged at a high speed, it is unnecessary to make the charging section 24 large and thereby the turn table 20 can be made compact. In addition, the number of measurement terminals can be reduced and cost is also reduced. A part of the charging area used in the conventional method can be used for other purposes such as characteristic measurement.

The present invention can also be applied to measuring an electrolytic capacitor, a film capacitor, and other capacitors as well as a ceramic capacitor.

In the present invention, various types of voltage applications can be considered. The number of times the initial voltage $E_1$ and the subsequent voltage $E_2$ are applied is not limited to one, and may be a plurality of times. For example, high and low voltages may be applied a plurality of times. There may be a first application of a voltage $E_1$, a second application of a voltage $E_2$ ($E_1 > E_2$), a third application of the voltage $E_1$, and a fourth application of the voltage $E_2$. The relationship among the voltages applied may be $E_1 > E_2 > E_3$, where $E_1$ indicates the voltage of a first application, $E_2$ indicates that of a second application, and $E_3$ indicates that of a third application. In any case, since charging is accelerated by applying a high voltage first and then applying a low voltage, it is necessary to include a stage in which a high voltage is applied first and then a stage in which a low voltage is applied.

Although embodiments of the invention have been disclosed herein, the invention is not limited to those embodiments, but also extends to modification and variations that might occur to one having ordinary skill in the art within the fair spirit and scope of the invention.

What is claimed is:

1. A capacitor charging method in which a DC voltage is intermittently applied to a capacitor, comprising the steps of:

applying an initial voltage $E_1$ to the capacitor for a time period $T_1$; and subsequently applying a voltage $E_2$ which is lower than the voltage $E_1$ to the capacitor for a time period $T_2$.

2. A capacitor charging method according to claim 1, wherein the initially applied voltage $E_1$ is at least 1.2 times as high as the subsequently applied voltage $E_2$.

3. A capacitor charging method according to claim 2, wherein the time period $T_1$ is shorter than time period $T_2$; and the time period $T_1$ is not less than the sum of a charging period and a transition period of the capacitor $C_0$, and is not more than 100 milliseconds.

4. A capacitor charging method according to claim 1, wherein the time period $T_1$ is shorter than the time period $T_2$; and the time period $T_1$ is not less than the sum of a charging period and a transition period of the capacitor $C_0$, and is not more than 100 milliseconds.

5. A capacitor charging method according to one of claims 1 to 4, further comprising the step of discharging the capacitor to ground in a period between the time period $T_1$ and the time period $T_2$.

6. A capacitor charging method according to one of claims 1 to 4, further comprising the step of applying a third voltage which is lower than the voltage $E_2$ to the capacitor in a period between the time period $T_1$ and the time period $T_2$.

7. A capacitor charging method according to claim 6, wherein said third voltage is a negative voltage.

8. A capacitor charging method according to one of claims 1 to 4, further comprising the step of open-circuiting the capacitor in a period between the time period $T_1$ and the time period $T_2$.

9. A capacitor charging method according to one of claims 1 to 4, wherein the voltage $E_1$ is higher than a rated voltage of the capacitor.

10. A capacitor charging method according to claim 9, wherein the voltage $E_2$ is said rated voltage of the capacitor.

11. A capacitor charging method according to claim 1, wherein the initially applied voltage $E_1$ is at least 2 times as high as the subsequently applied voltage $E_2$.

* * * * *

UNITED STATES PATENT AND TRADEMARK OFFICE
CERTIFICATE OF CORRECTION

PATENT NO : 6,066,940
DATED : May 23, 2000
INVENTOR(S) : Yoshinao Nishioka et al.

It is certified that error appears in the above identified patent and that said Letters Patent are hereby corrected as shown below.

Please correct section [63] on the face of the patent as follows:

--Continuation-in-part of application No. 09/003,263, Jan. 6, 1998.--

Signed and Sealed this

Twenty-fourth Day of April, 2001

Attest:

NICHOLAS P. GODICI

Attesting Officer

Acting Director of the United States Patent and Trademark Office